(12) United States Patent
Nitsuma (10) Patent No.: US 8,727,438 B2
(45) Date of Patent: May 20, 2014

(54) SEAT FRAME AND VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 372 days.

(21) Appl. No.: 13/061,251

(22) PCT Filed: Aug. 28, 2009

(86) PCT No.: PCT/JP2009/065088
§ 371 (c)(1),
(2), (4) Date: Feb. 28, 2011

(87) PCT Pub. No.: WO2010/024395
PCT Pub. Date: Mar. 4, 2010

(65) Prior Publication Data
US 2011/0193379 A1  Aug. 11, 2011

(30) Foreign Application Priority Data
Sep. 1, 2008  (JP) ................................ 2008-223743

(51) Int. Cl.
*B60N 2/427* (2006.01)
*B60N 2/42* (2006.01)

(52) U.S. Cl.
USPC ............................. 297/216.14; 297/216.13

(58) Field of Classification Search
USPC ........................ 297/216.13, 216.14, 452.56
See application file for complete search history.

(56) References Cited

U.S. PATENT DOCUMENTS

| 2,144,233 | A | * | 1/1939 | Stewart .................... 297/367 R |
| 3,877,749 | A | * | 4/1975 | Sakurai et al. ........... 297/216.14 |
| 4,938,527 | A | * | 7/1990 | Schmale et al. ......... 297/216.13 |
| 6,857,698 | B2 | * | 2/2005 | Saberan et al. ......... 297/216.13 |
| 6,871,913 | B2 | * | 3/2005 | Malsch et al. ................ 297/410 |
| 6,921,132 | B2 | * | 7/2005 | Fujita et al. .............. 297/216.13 |
| 7,090,300 | B2 | * | 8/2006 | Fujita ....................... 297/452.49 |
| 7,097,242 | B2 | * | 8/2006 | Farquhar et al. ......... 297/216.12 |
| 7,537,283 | B2 | * | 5/2009 | Niitsuma et al. ......... 297/216.13 |

FOREIGN PATENT DOCUMENTS

| JP | 2003-335162 A | 11/2003 |
| JP | 2004-209017 A | 7/2004 |
| JP | 2006-213201 A | 8/2006 |
| JP | 2006-347436 A | 12/2006 |

* cited by examiner

*Primary Examiner* — David R Dunn
*Assistant Examiner* — Tania Abraham
(74) *Attorney, Agent, or Firm* — Drinker Biddle & Reath LLP (57) ABSTRACT

A seat back frame and associated vehicle seat are provided for effectively reducing an input load applied onto a reclining mechanism at the time of rear surface collision, the frame and seat having an energy absorbing member fixed to a coupling portion of a lower frame for coupling left and right side frames on the lower side. Since the energy absorbing member is plastically deformable by pressing from the backrest front surface side, the energy absorbing member absorbs shock energy at the time of the rear surface collision to reduce an input load imposed onto a reclining mechanism.

12 Claims, 5 Drawing Sheets

SEAT FRAME AND VEHICLE SEAT

CROSS REFERENCE TO RELATED APPLICATIONS

This application is the U.S. national phase of the International Patent Application No. PCT/JP2009/065088 filed Aug. 28, 2009, which claims the benefit of Japanese Patent Application No. 2008-223743 filed Sep. 1, 2008, the entire content of which is incorporated herein by reference.

BACKGROUND

The present invention relates to a seat frame and a vehicle seat, particularly to a seat frame for reducing an input load to a reclining mechanism at the time of rear surface collision, and a vehicle seat.

Conventionally, when a motor vehicle is collided at its rear part or collides when backing up, so called at the time of rear surface collision, a seated passenger is sometimes radically moved rearward due to inertia and pushed onto a backrest front surface of a seat back. Accordingly, there is a fear that an excessive input load is provided to a reclining mechanism for adjusting a reclining angle of the seat back.

Figure 5:
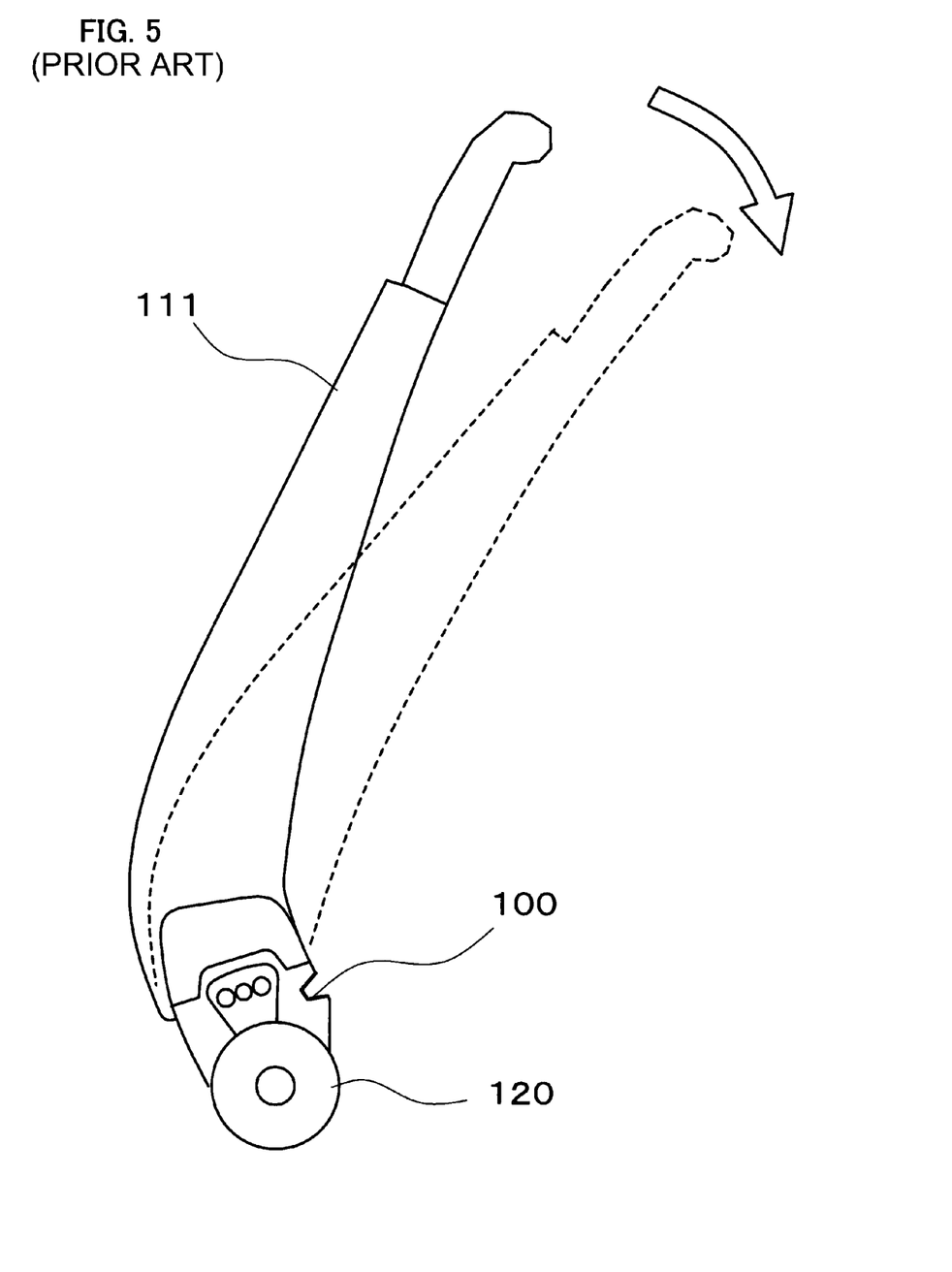
FIG. 5 is an illustrative side view showing operation of a conventional seat frame at the time of the rear surface collision.

In order to prevent such an excessive input load to the reclining mechanism, as shown in FIG. 5, a notch 100 is formed in a lower side part of a seat back frame 111 in a seat frame for a vehicle seat of a motor vehicle or the like. At the time of the rear surface collision, a seat back (the seat back frame 111) can fall downward from a part where this notch 100 is formed. Thus, the excessive load above a limit provided to a reclining mechanism 120 is prevented (for example, refer to Japanese Patent Application Publication No. 2003-335162 ("the '162 Publication"), and Japanese Patent Application Publication No. 2006-347436 ("the '436 Publication")).

SUMMARY

In the techniques disclosed in the '162 Publication and the '436 Publication, since the entire seat back falls rearward taking the notch 100 formed in the lower side part of the seat back frame 111 as a starting point at the time of the rear surface collision, the input load to the reclining mechanism 120 is reducible. However, since there is a need for ensuring a space for the seat back to fall on the rear side of the vehicle seat, it is sometimes difficult to apply the techniques, depending on a vehicle type.

In consideration with the above problem, various embodiments of the present invention provide a seat frame applicable to various vehicle types, the seat frame reducing an input load to a reclining mechanism at the time of rear surface collision, and a vehicle seat.

With a seat frame according to an embodiment, the above problem is solved by a seat frame including a seat back frame attached to a seating frame via a reclining mechanism, the seat back frame including a pair of side frames arranged to be spaced from each other at least in the left and right direction and to extend in the upper and lower direction, a lower frame for coupling a pair of the side frames in the vicinity of the reclining mechanism, and an energy absorbing member attached on the front side of the lower frame, wherein the energy absorbing member is plastically deformable by pressing from the backrest front surface side.

With the above configuration, when a seated passenger is radically moved rearward due to inertia and pushed onto a backrest front surface of a seat back at the time of rear surface collision, a lumbar part of the passenger presses downward a deformation portion of the energy absorbing member via a cushion material to plastically deform the energy absorbing member. Since this energy absorbing member absorbs shock energy when being plastically deformed, a load provided to the reclining mechanism is reduced. Since the shock energy is absorbed without inclining the seat back rearward, there is no need for a space on the rear side of a vehicle seat, so that the seat frame is applicable to various vehicle types.

In a preferred embodiment, the lower frame includes a pair of side portions respectively fixed to a pair of the side frames, and a coupling portion for coupling a pair of the side portions, and the energy absorbing member has a plastically-deformable deformation portion arranged on the front side of the coupling portion, a fixed end formed to be continuous to one side of the deformation portion and fixed only to the coupling portion, and a free end formed on the opposite side of the fixed end relative to the deformation portion.

With the above configuration, the fixed end formed to be continuous to the one side of the deformation portion is fixed only to the coupling portion, and an end formed on the opposite side of the fixed end relative to the deformation portion serves as the free end. Thus, the deformation direction of the energy absorbing member is limited to one direction, so that variation of deformation behavior is eliminated and a desired deformation characteristic is obtained. Therefore, a planned or predetermined effect is obtained upon the rear surface collision in various situations. That is, even at the rear surface collision generated in various situations, the energy absorbing member is plastically deformed in a certain manner so that the load inputted to the reclining mechanism is reduced.

Further, favorably, in an embodiment, the free end of the energy absorbing member is arranged to extend on the opposite side of the fixed end more than an end of the coupling portion on the opposite side of the side where the fixed end is fixed.

With the above configuration, the free end of the energy absorbing member is arranged to extend on the opposite side of the fixed end more than the end of the coupling portion on the opposite side of the side where the fixed end is fixed. Thus, even at the time of deformation of the energy absorbing member, the free end of the energy absorbing member is not brought into contact with the coupling portion of the lower frame. Therefore, even with a large deformation amount, the energy absorbing member is smoothly deformed, and the shock energy is absorbed relatively uniformly in any deformation processes.

Favorably, in an embodiment, the free end of the energy absorbing member is turned up.

With the above configuration, since the free end is turned up, damage to a cushion material or a skin material arranged on the back surface side of the seat back is prevented at the time of the deformation of the energy absorbing member.

In a preferred embodiment, the energy absorbing member is formed by a metal plate, and energy to be absorbed is variable depending on a shape, thickness, and a material of the energy absorbing member.

With the above configuration, the energy absorbing member having a different energy absorbing characteristic is arranged depending on size of a vehicle or the like. By providing the energy absorbing member suitable for each type of the vehicle, versatility of the seat frame is improved.

With a vehicle seat according an embodiment, the above problem is solved by providing the seat frame according to any of embodiments described above.

With such a configuration, the vehicle seat provided with the above operations and effects are obtained.

With the seat frame according to an embodiment, since the energy absorbing member is plastically deformed at the time of the rear surface collision, the shock energy imposed onto the seat back is absorbed, so that the load provided to the reclining mechanism is reduced.

With the seat frame according to an embodiment, the energy absorbing member having the desired deformation characteristic is obtained. Thus, even upon the rear surface collision in various situations, the energy absorbing member is plastically deformed in a certain manner so that the load inputted to the reclining mechanism is reduced.

With the seat frame according to an embodiment, even in the case where the deformation amount of the energy absorbing member is large, the shock energy is absorbed.

With the seat frame according to an embodiment, at the time of the deformation of the energy absorbing member, the damage to the cushion material or the skin material arranged on the back surface side of the seat back is prevented.

With the seat frame according to an embodiment, the energy absorbing member suitable for each type of the vehicle is arranged, and the versatility of the seat frame is enhanced.

BRIEF DESCRIPTION OF THE DRAWINGS

The invention is described below according to various embodiments illustrated in the drawings and further described in the following paragraphs.

DETAILED DESCRIPTION

Hereinafter, an embodiment of the present invention will be described with reference to the drawings. Members, arrangement, and the like described below do not limit the present invention but, as a matter of course, can variously be modified along the gist of the present invention.

Figure 1:
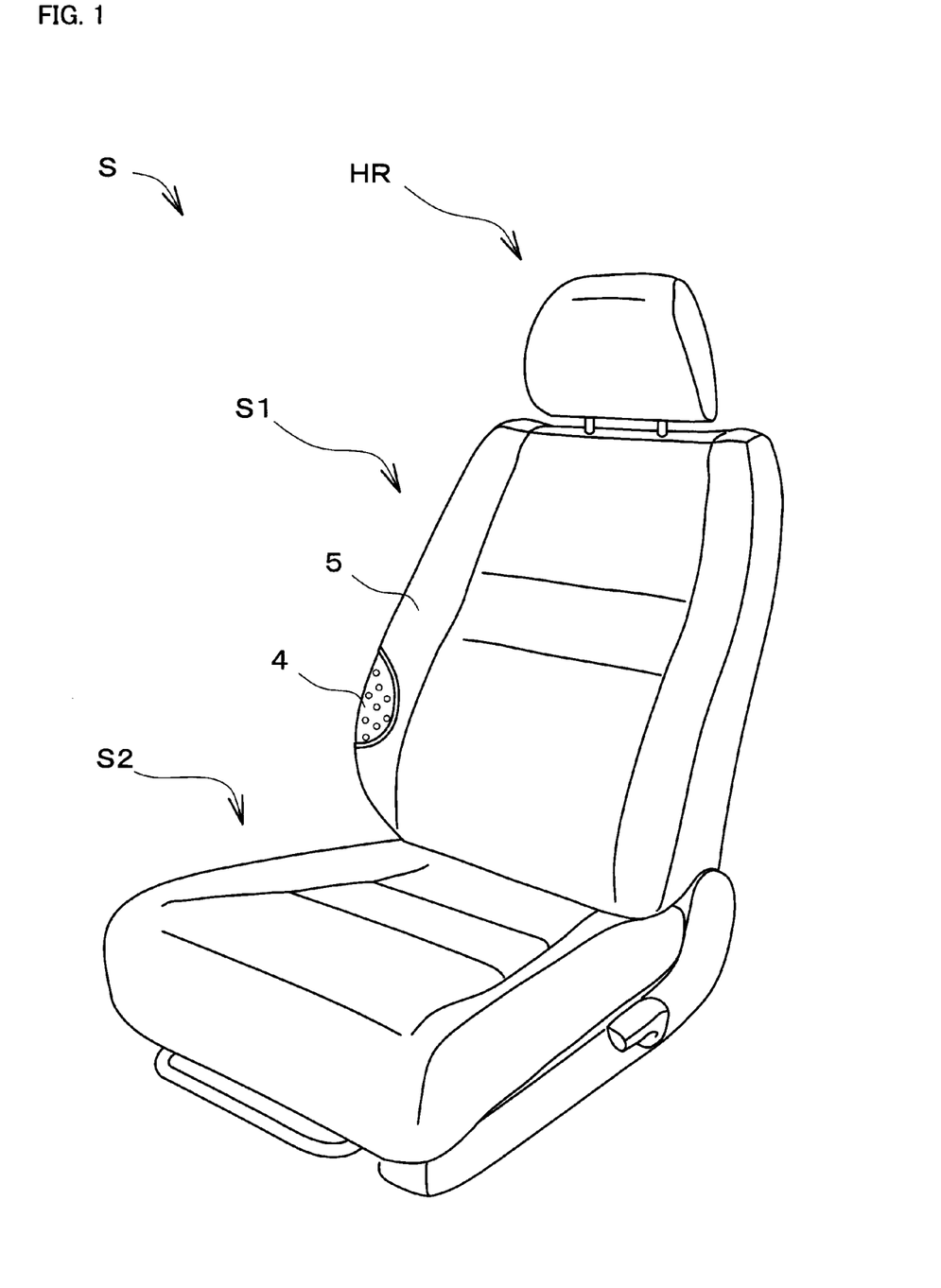
FIG. 1 is a pictorial schematic perspective view of a seat according to an embodiment of the present invention.

As shown in FIG. 1, a vehicle seat S according to the present embodiment is provided with a seat back S1, a seat cushion S2, and a headrest HR attached to an upper part of the seat back S1. The seat back S1 and the seat cushion S2 of the present embodiment are formed by respectively attaching cushion materials 4 to a seat back frame 11 and a seating frame 12 (refer to FIG. 2) and covering outer peripheries of the cushion materials 4 with skin materials 5. The headrest HR is arbitrarily formed but provided with at least a head support portion supporting a head part of a passenger, and a pillar for equipping the head support portion on the side of the seat back S1.

The passenger seating side of the seat back S1 indicates the front side, and the side of the seat back S1 where the headrest HR is attached indicates the upper side.

Figure 2:
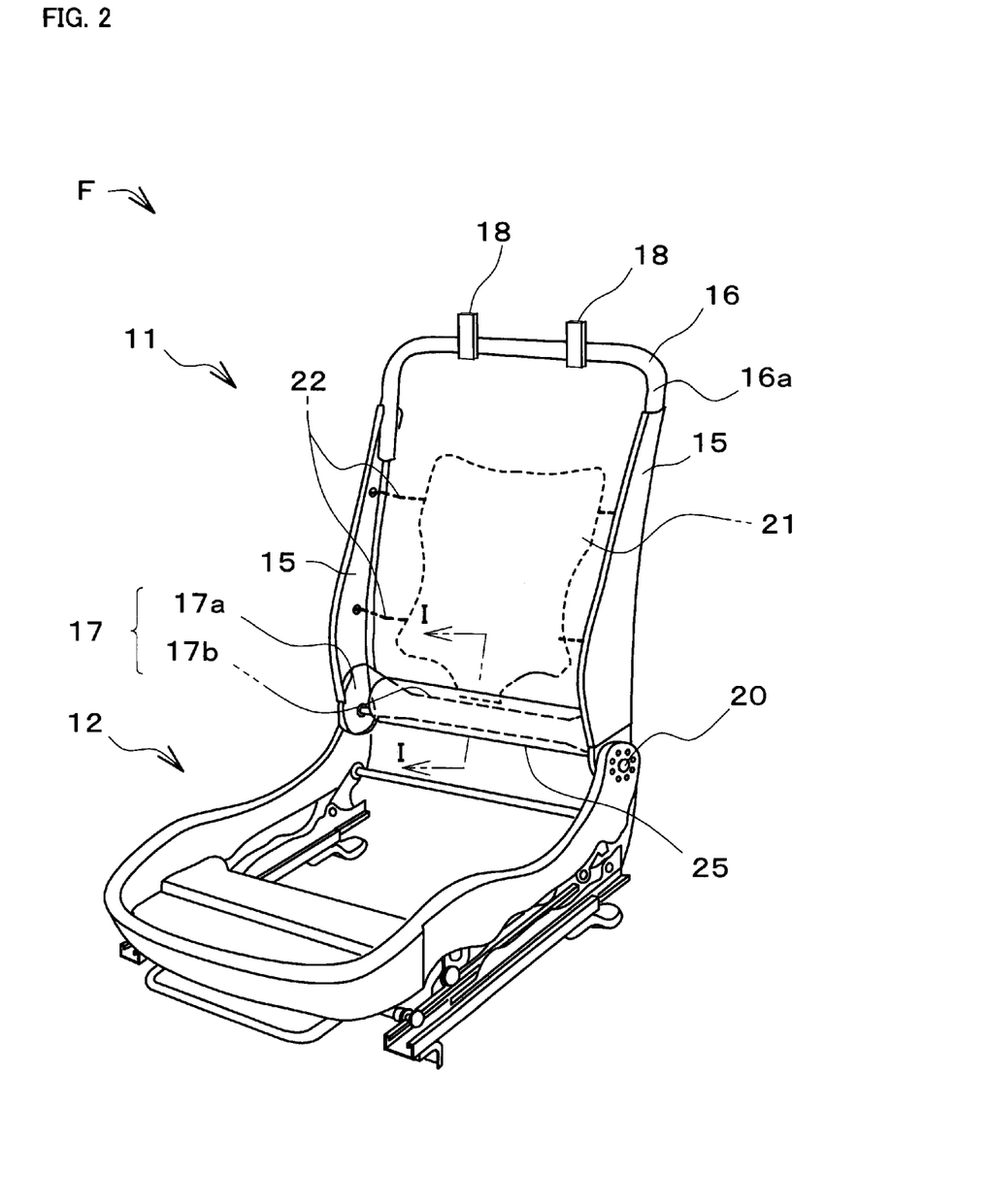
FIG. 2 is a pictorial schematic perspective view of a seat frame according to the embodiment of the present invention.

Next, based on FIG. 2, a seat frame F according to the present embodiment will be described.

The seat frame F is formed by mainly including the seat back frame 11 and the seating frame 12 described above, and a headrest frame (not shown).

The seat back frame 11 is covered with the cushion material 4 (not shown) or the like to support the back of the passenger from the rear side, and in the present embodiment, formed into a substantially rectangular frame body. A lower end of the seat back frame 11 is coupled to the seating frame 12 via a reclining mechanism 20 so that reclining is adjustable.

In more detail, the seat back frame 11 is formed by mainly including side frames 15, 15 arranged on the side surface sides in the left and right direction, an upper frame 16 for coupling upper ends of the side frames 15, 15, and a lower frame 17 for coupling lower ends.

The side frames 15 are a pair of extending members forming side surfaces of the seat back frame 11, arranged to be spaced from each other in the left and right direction and to have a predetermined length in the upper and lower direction. By respectively bending inward front ends and rear ends of main bodies of the flat plate-like side frames 15, 15, required strength is ensured.

The upper frame 16 is a substantially U shape member. Side surface portions 16a, 16a of the upper frame 16 are arranged to be partially overlapped with upper parts of the side frames 15, 15, and integrally fixed and jointed to the side frames 15, 15 in the overlapped parts.

In the upper part of the seat back frame 11, the headrest frame (not shown) is arranged. A pillar (not shown) of the headrest frame is attached to pillar support portions 18, 18 provided in the upper frame 16.

A pressure receiving member 21 supporting the cushion material 4 from the rear side is arranged between a pair of the side frames 15, 15. As coupling members for supporting the pressure receiving member 21 and coupling the side frames 15, 15, two wires 22, 22 are bridged between the left and right side frames 15, 15.

The lower frame 17 is a member formed by left and right side portions 17a, 17a which are fixed to the side frames 15, 15, and a coupling portion 17b for coupling the left and right side portions 17a, 17a. The side portions 17a, 17a are arranged to be partially overlapped with lower parts of the side frames 15, 15, and integrally fixed and jointed to the side frames 15, 15 in the overlapped parts. An energy absorbing member 25 described below is fixed to the coupling portion 17b for integrally coupling the left and right side portions 17a, 17a.

The side portions 17a, 17a of the lower frame 17 are coupled to the seating frame 12 via the reclining mechanism 20.

Figure 3:
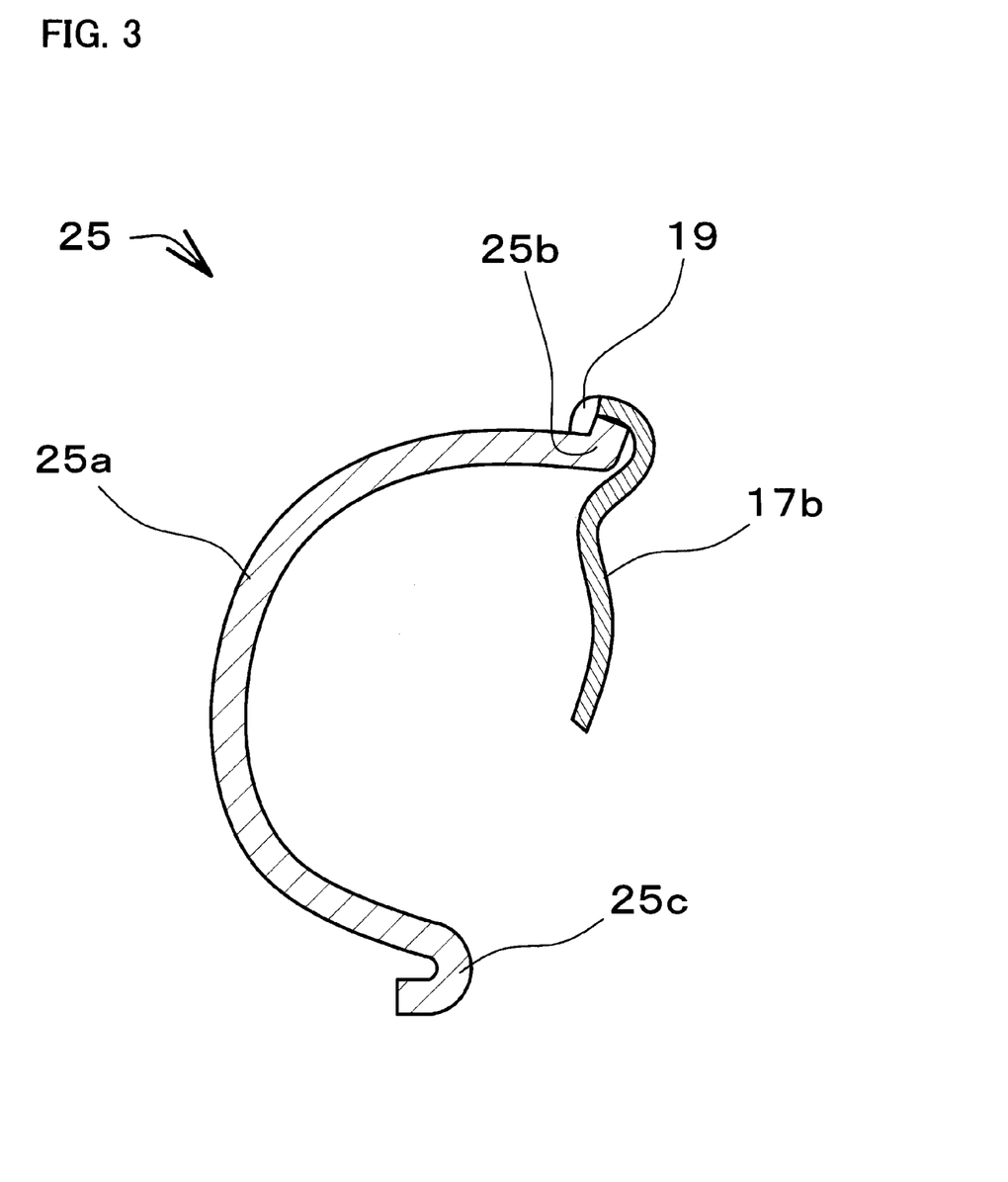
FIG. 3 is a center sectional view (by the line I-I) of a lower frame and an energy absorbing member according to the embodiment of the present invention.

FIG. 3 is the center sectional view (by the line I-I) of the lower frame 17 and the energy absorbing member 25.

The energy absorbing member 25 of the present embodiment is formed to have a substantially C shape section by curving a substantially rectangular plate-like member in the upper and lower direction, fixed to the coupling portion 17b of the lower frame 17, and arranged at a position sandwiched between the left and right side portions 17a, 17a. This energy absorbing member 25 is formed by a deformation portion 25a extending on the front side of the coupling portion 17b, a fixed end 25b formed on the upper part side of the deformed portion 25a, and a free end 25c formed on the opposite side of the fixed end 25b relative to the deformation portion 25a, that is, on the lower part side of the deformation portion 25a in the present embodiment.

Specifically, by fixing only the fixed end 25b formed on the upper part side of the deformation portion 25a of the energy absorbing member 25 only to the coupling portion 17b of the lower frame 17, the energy absorbing member 25 is arranged. That is, the free end 25c on the lower part side of the energy absorbing member 25 is not fixed, and formed as a free end that moves downward or rearward in accordance with deformation of the deformation portion 25a by pressing from the backrest front surface side.

In such a way, since one of the upper and lower ends of the energy absorbing member 25 serves as the free end, in comparison to the case where the energy absorbing member is fixed at two points on the upper and lower sides, plastic deformation of the deformation portion 25a can smoothly be performed, and further a change in deformation stress along with progress of the plastic deformation is reduced.

The free end 25c is arranged to extend on the opposite side of the fixed end 25b more than an end of the coupling portion 17b of the lower frame 17 on the opposite side of the side where the fixed end 25b is fixed. In the present embodiment, as shown in FIG. 3, the free end 25c is arranged to extend on the lower side of the lower end of the coupling portion 17b. With such a configuration, even when the energy absorbing member 25 is largely deformed, the free end 25c is not brought into contact with the coupling portion 17b of the lower frame 17. Therefore, irrespective of a deformation amount of the energy absorbing member 25, shock energy can relatively be absorbed uniformly and continuously.

Although the upper part side of the energy absorbing member 25 serves as the fixed end 25b, and the lower part side serves as the free end 25c in the present embodiment, the lower part side of the energy absorbing member 25 may be fixed to the coupling portion 17b as the fixed end 25b, and the upper part side may be movable as the free end 25c at the time of the deformation.

A front end of the free end 25c is turned up toward the front side, and the turned-up part is formed into a round shape. With such a shape, even when the energy absorbing member 25 is deformed by pressing from the backrest front surface side, moved rearward, and brought into contact with the cushion material 4 or the skin material 5 arranged on the back surface side of the seat back S1, the cushion material 4 or the skin material 5 is not damaged.

The energy absorbing member 25 is welded and jointed so that the fixed end 25b is continuous along the longitudinal direction of the coupling portion 17b of the lower frame 17, and a welding portion 19 is formed in the joint part. Size of the energy absorbing member 25 in the left and right direction is adjusted in a manner that left and right ends are arranged distant from both of the side portions 17a, 17a of the lower frame 17.

A method for fixing the fixed end 25b to the coupling portion 17b of the lower frame 17 may be rivet jointing, bolt fastening, or spot welding in addition to welding. The fixed end 25b may be caulked and fixed to the coupling portion 17b.

The energy absorbing member 25 is desirably at a position where a lumbar part of the passenger is arranged on the backrest front surface side of the deformation portion 25a. With such a positional relation, the lumbar part of the passenger moved rearward due to inertia at the time of the rear surface collision can press the energy absorbing member 25 through the cushion material 4 to deform the deformation portion 25a. Since shock to the lumbar part of the passenger positioned at height close to the reclining mechanism 20 is absorbed by the deformation of the energy absorbing member 25 (the deformation portion 25a), the shock energy which is not absorbed by depressing a back part into a backrest front surface is absorbed. That is, together with a shock load inputted to the reclining mechanism 20, a shock load transmitted to the lumbar part of the passenger is reduced.

As described above, the energy absorbing member 25 is attached to be slightly distant from both of the inner sides of the side portions 17a, 17a of the lower frame 17. By not fixing the energy absorbing member to any of the left and right side portions 17a, 17a, the deformation direction of the energy absorbing member 25 is limited to one direction at any position. That is, by simplifying deformation behavior of the energy absorbing member 25, reproducibility of the plastic deformation is improved, so that variation is eliminated and a desired deformation characteristic is obtained. Therefore, even in the case where a position displaced from the center of the energy absorbing member 25 is pressed by the lumbar part of the passenger, the change in the stress required for the plastic deformation is small. Upon the rear surface collision generated in various situations, the energy absorbing member 25 can with certainty be deformed and a planned or predetermined effect is obtained.

Since a fixing position of the energy absorbing member 25 is limited, an effect for improving an assembling property is also obtained.

Further, other effects due to the energy absorbing member 25 arranged slightly distant from the inner sides of the left and right side portions 17a, 17a will be described.

In the case where the side frames 15 and the side portions 17a, 17a are deformed inward due to a load received from the side at the time of side surface collision, the left and right side portions 17a, 17a are abutted with side ends of the energy absorbing member 25. Since the energy absorbing member 25 has a substantially C shape section, strength in the left and right direction is higher than that in the front and rear direction structurally. Therefore, deformation resistance is large against the stress imposed in the left and right direction at the time of the side surface collision or the like, so that deformation of the seat frame F is prevented.

The energy absorbing member 25 is formed by a plastically-deformable metal or resin plate body, and in particular, desirably formed by a material having a high plastic deformability such as soft iron and aluminum alloy. By selecting a shape, thickness, a material, and the like of the deformation portion 25a, energy to be absorbed is adjusted. For example, when strength is increased by increasing the thickness of the energy absorbing member 25 or changing the material into a material having a high yield strength, larger energy is absorbed. That is, by obtaining the desired deformation characteristic, the energy absorbing member 25 having an optimal energy absorbing characteristic is manufactured, so that the seat frame F suitable for each type of a vehicle is provided.

By forming a hole or a slit at a predetermined point of the energy absorbing member 25, the energy absorbing member is deformed stepwise in accordance with the input load. For example, at the time of the rear surface collision, by forming several small holes or slits in parts where the load is inputted by the lumbar part of the passenger at an initial stage so that the energy absorbing member is easily deformed, the load imposed onto the reclining mechanism 20 via the seat back S1 at the initial stage of the rear surface collision is reduced, and the shock load which the lumbar part of the passenger receives can also be reduced.

Next, operation of the energy absorbing member 25 will be described based on FIG. 4.

Figures 4A, 4B:
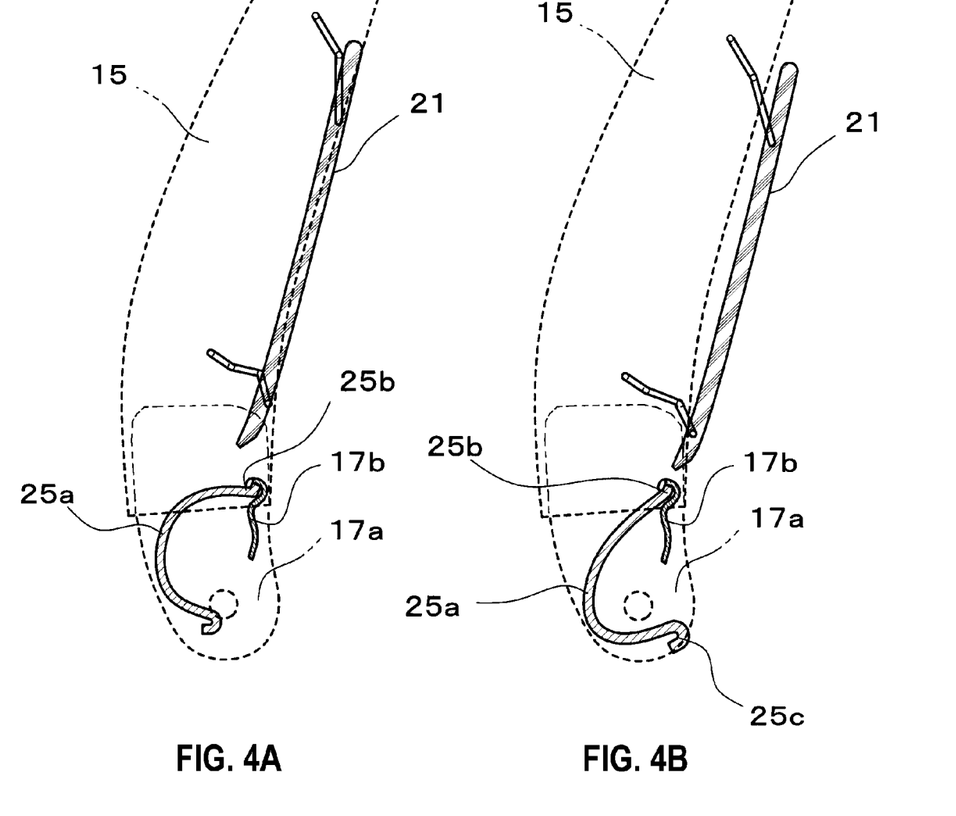
FIG. 4 is a pictorial concept illustrative view showing a state of the energy absorbing member before and after rear surface collision according to the embodiment of the present invention.

FIG. 4 is an illustrative view showing a state of the energy absorbing member 25 at the time of the rear surface collision. FIG. 4(a) shows the state before the collision, and FIG. 4(b) shows the state after the collision.

When the passenger receives the shock from the rear side and is moved rearward due to the inertia, the back part of the passenger is depressed on the backrest front surface side of the seat back S1 while pressing the pressure receiving member 21 rearward. At this time, the lumbar part of the passenger presses the energy absorbing member 25 rearward through the cushion material 4 (not shown) to plastically deform the energy absorbing member. Specifically, when the load in accordance with rearward movement of the passenger is imposed onto the deformation portion 25a of the energy absorbing member 25, the deformation portion 25a is plastically deformed downward or rearward in accordance with the imposed load. In accordance with the deformation of the deformation portion 25a, the free end 25c is moved rearward and sometimes brought into contact with the cushion material 4 or the skin material 5 arranged on the back surface side of the seat back S1. However, since the free end is turned up into a round shape, the cushion material 4 or the skin material 5 is not damaged.

Due to the plastic deformation of this energy absorbing member 25, the shock load at the time of the rear surface collision is absorbed, so that the load imposed onto the seat back S1 is reduced. In such a way, the shock load provided to the reclining mechanism 20 is reduced, and the load above a limit imposed onto the reclining mechanism 20 is prevented. At the same time, the shock load applied onto the lumbar part of the passenger can also be reduced. The free end 25c of the energy absorbing member 25 is arranged to expand on the lower side of the lower end of the coupling portion 17b. Thus, even when the energy absorbing member 25 is largely deformed, the free end 25c is not brought into contact with the coupling portion 17b of the lower frame 17, so that the change in the deformation stress along with progress of the plastic deformation of the deformation portion 25a is reduced.

Accordingly, as described above, by reducing the input load provided to the reclining mechanism 20 at the time of the rear surface collision, damage to the reclining mechanism 20 is prevented, and at the same time, the shock load applied onto the lumbar part of the passenger can also be reduced.

Further, since the seat back S1 is not inclined rearward, unlike a conventional mechanism using a notch 100, a chest part of the passenger is more deeply depressed into the seat back S1. Thereby, by decreasing a relative distance between the head part and the headrest HR, shear force imposed onto a cervical part is furthermore reduced.

Since the energy absorbing member 25 fixed to the coupling portion 17b of the lower frame 17 absorbs the energy at the time of the rear surface collision, there is no need for reclining the seat back S1 rearward. Therefore, there is no need for a space on the rear side of the vehicle seat S, and the seat frame can be applied to various vehicle types. Further, with a simple structure, the seat frame F reduces the input load to the reclining mechanism 20 and the vehicle seat S can be provided at low cost.

Although the seat back S1 of a front seat of a motor vehicle is described in the present embodiment as a specific example, the present invention is not limited to this. The same configuration can also be applied to a seat back of a rear seat as a matter of course.

TABLE OF REFERENCE CHARACTERS

S Vehicle seat
S1 Seat back
S2 Seat cushion
HR Headrest
F Seat frame
4 Cushion material
5 Skin material
11, 111 Seat back frame
12 Seating frame
15 Side frame
16 Upper frame
16a Side surface portion
17 Lower frame
17a Side portion
17b Coupling portion
18 Pillar support portion
19 Welding portion
20, 120 Reclining mechanism
21 Pressure receiving member
22 Wire
25 Energy absorbing member
25a Deformation portion
25b Fixed end
25c Free end
100 Notch

The invention claimed is:

1. A seat frame, comprising:
a seat back frame attached to a seating frame via a reclining mechanism, the seat back frame including:
a pair of side frames arranged spaced apart from each other in a left and right direction and extending in an upper and lower direction;
a lower frame for coupling the pair of the side frames in a vicinity of the reclining mechanism; and
an energy absorbing member attached on a front side of the lower frame, wherein:
the energy absorbing member is plastically deformable by pressing from a backrest front surface side;
the lower frame includes a pair of side portions respectively fixed to the pair of the side frames, and a coupling portion for coupling the pair of the side portions;
the energy absorbing member has a plastically-deformable deformation portion arranged on a front side of the coupling portion, a fixed end that is continuous to one side of the deformation portion and extends along a longitudinal direction of the coupling portion, and a free end formed on an opposite side of the fixed end relative to the deformation portion; and
the fixed end is fixed only to the coupling portion at its side that extends and is continuously fixed along the longitudinal direction of the coupling portion.

2. The seat frame according to claim 1, wherein:
the free end of the energy absorbing member is bent forward in a direction towards a front of the plastically deformable portion.

3. The seat frame according to claim 1, wherein:
the free end of the energy absorbing member is disposed on a lower side than a lower end of the coupling portion of the lower frame.

4. The seat frame according to claim 1, wherein:
the fixed end of the energy absorbing member is welded to the coupling portion of the lower frame.

5. A seat frame, comprising:
a seat back frame attached to a seating frame via a reclining mechanism, the seat back frame including:
left and right side frames arranged spaced apart from each other in a left and right direction and extending in an upper and lower direction;
a lower frame for coupling the left and right side frames at lower portions of the left and right side frames; and
an energy absorbing member attached on a front side of the lower frame, wherein:

the energy absorbing member is plastically deformable by pressing from a backrest front surface side;
the lower frame is formed of a plate-shaped member;
the energy absorbing member does not couple the left and right side frames with each other;
the lower frame includes a pair of side portions respectively fixed to the left and right side frames, and a coupling portion for coupling the pair of the side portions;
the energy absorbing member has a plastically-deformable deformation portion arranged on a front side of the coupling portion, a fixed end that is continuous to one side of the deformation portion and extends along a longitudinal direction of the coupling portion, and a free end formed on an opposite side of the fixed end relative to the deformation portion; and
the free end of the energy absorbing member is bent forward in a direction towards a front of the plastically deformable portion.

6. The seat frame according to claim 5, wherein:
the free end of the energy absorbing member is disposed on a lower side than a lower end of the coupling portion of the lower frame.

7. The seat frame according to claim 5, wherein:
the fixed end of the energy absorbing member is welded to the coupling portion of the lower frame.

8. A seat frame, comprising:
a seat back frame attached to a seating frame via a reclining mechanism, the seat back frame including:
 a pair of side frames arranged spaced apart from each other in a left and right direction and extending in an upper and lower direction;
 a lower frame for coupling the pair of the side frames in a vicinity of the reclining mechanism; and
 an energy absorbing member attached on a front side of the lower frame, wherein:
the energy absorbing member is plastically deformable by pressing from a backrest front surface side;
the lower frame includes a pair of side portions respectively fixed to the pair of the side frames, and a coupling portion for coupling the pair of the side portions;
the energy absorbing member has a plastically-deformable deformation portion arranged on a front side of the coupling portion, a fixed end that is continuous to one side of the deformation portion and extends along a longitudinal direction of the coupling portion, and a free end formed on an opposite side of the fixed end relative to the deformation portion; and
the free end of the energy absorbing member is bent forward in a direction towards a front of the plastically deformable portion.

9. The seat frame according to claim 8, wherein:
the free end of the energy absorbing member is disposed on a lower side than a lower end of the coupling portion of the lower frame.

10. The seat frame according to claim 8, wherein:
the fixed end of the energy absorbing member is welded to the coupling portion of the lower frame.

11. A seat frame, comprising:
a seat back frame attached to a seating frame via a reclining mechanism, the seat back frame including:
 a pair of side frames arranged spaced apart from each other in a left and right direction and extending in an upper and lower direction;
 a lower frame for coupling the pair of the side frames in a vicinity of the reclining mechanism;
 an energy absorbing member attached on a front side of the lower frame; and
 a pressure receiving member disposed between the pair of the side frames, wherein:
the energy absorbing member is plastically deformable by pressing from a backrest front surface side;
the lower frame includes a pair of side portions respectively fixed to the pair of the side frames, and a coupling portion for coupling the pair of the side portions;
the energy absorbing member has a plastically-deformable deformation portion arranged on a front side of the coupling portion, a fixed end that is continuous to one side of the deformation portion and extends along a longitudinal direction of the coupling portion, and a free end formed on an opposite side of the fixed end relative to the deformation portion;
an upper end portion of the energy absorbing member and a lower end portion of the pressure receiving member are in a same vertical plane; and
the free end is disposed on a lower side than the fixed end.

12. A seat frame, comprising:
a seat back frame attached to a seating frame via a reclining mechanism, the seat back frame including:
 left and right side frames arranged spaced apart from each other in a left and right direction and extending in an upper and lower direction;
 a lower frame for coupling the left and right side frames at lower portions of the left and right side frames; and
 an energy absorbing member attached on a front side of the lower frame, wherein:
the energy absorbing member is plastically deformable by pressing from a backrest front surface side;
the lower frame is formed of a plate-shaped member;
the energy absorbing member does not couple the left and right side frames with each other;
the lower frame includes a pair of side portions respectively fixed to the left and right side frames, and a coupling portion for coupling the pair of the side portions;
the energy absorbing member has a plastically-deformable deformation portion arranged on a front side of the coupling portion, a fixed end that is continuous to one side of the deformation portion and extends along a longitudinal direction of the coupling portion, and a free end formed on an opposite side of the fixed end relative to the deformation portion; and
the free end of the energy absorbing member is disposed on a lower side than a lower end of the coupling portion of the lower frame.

* * * * *